Aug. 30, 1955     S. SILVERMAN     2,716,299
MITERED JOINT FITTING
Filed Sept. 3, 1952     2 Sheets-Sheet 1
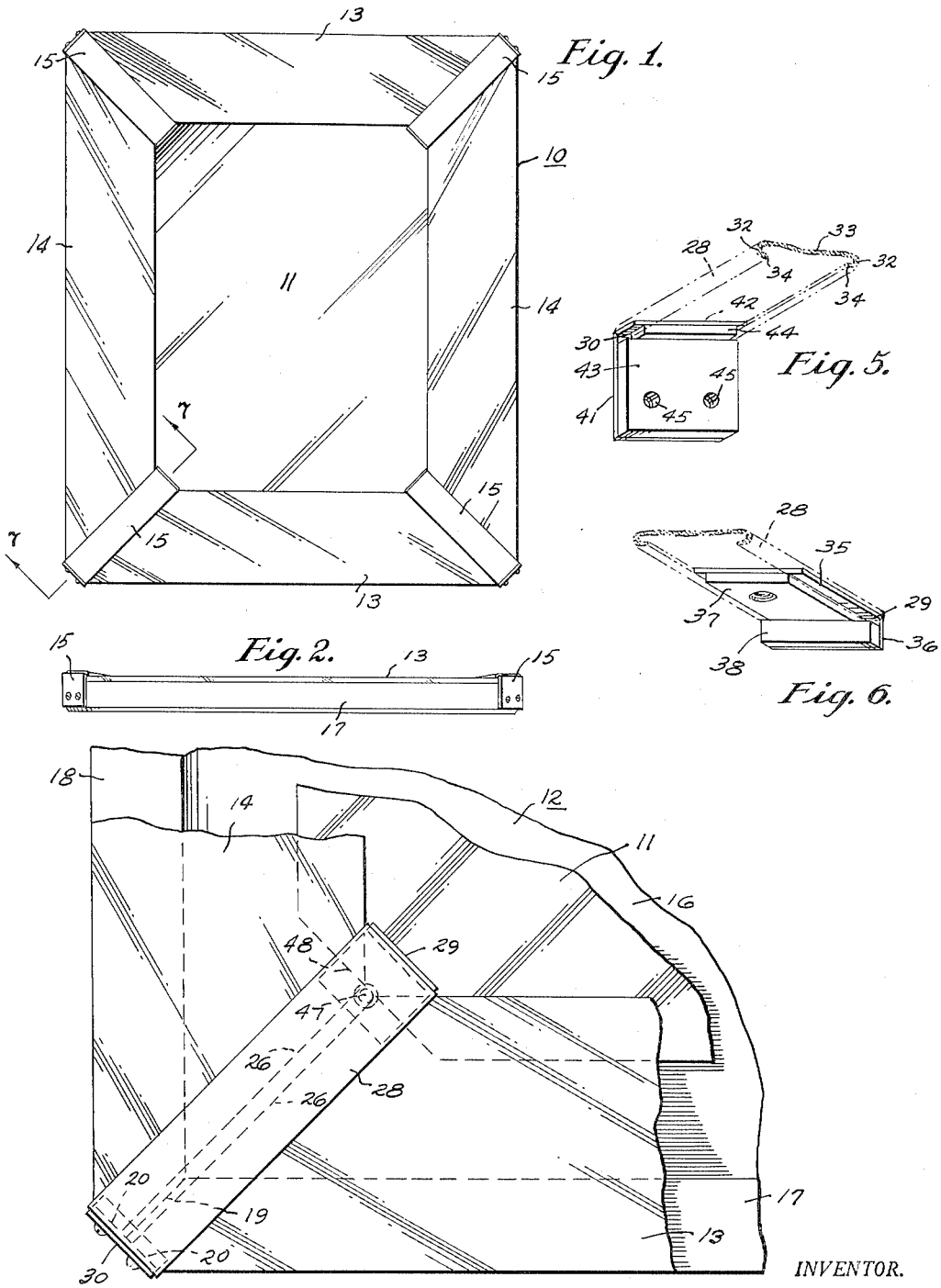
INVENTOR.
SEBET SILVERMAN
BY Leo Edelson
Attorney

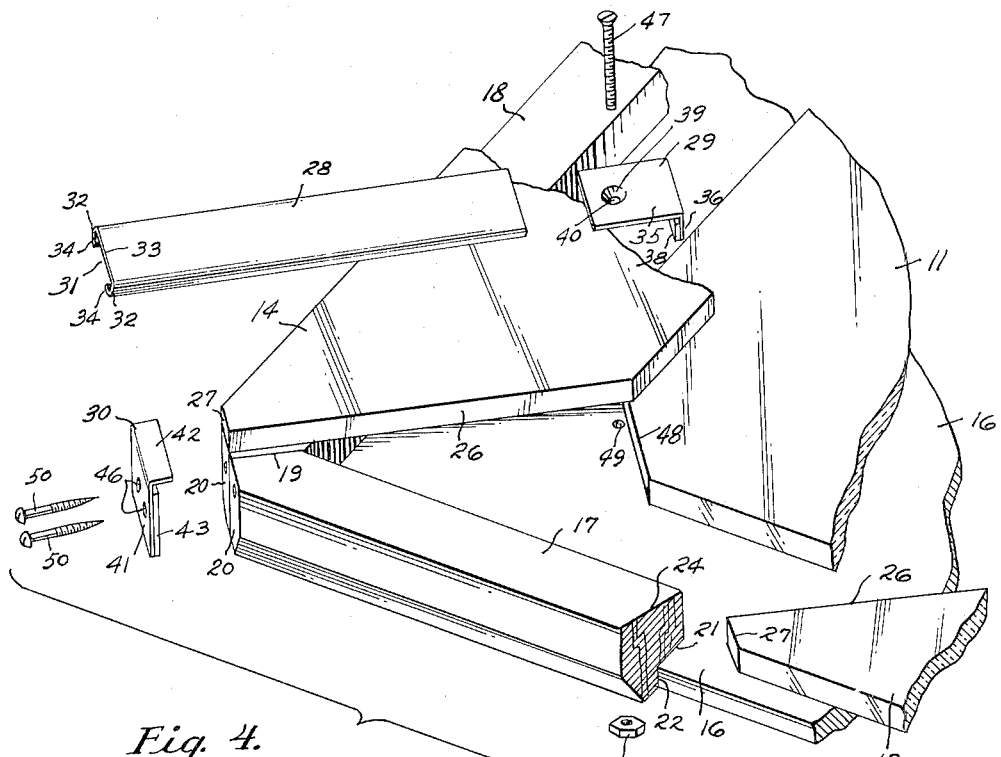
Fig. 4.
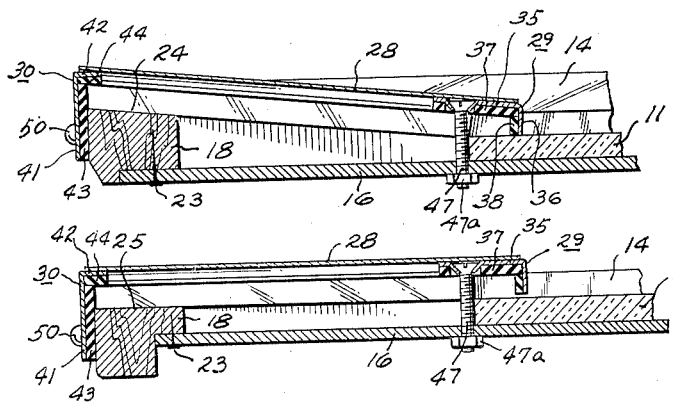
Fig. 7.
Fig. 8.
INVENTOR.
SEBET SILVERMAN
BY
*Leo Edelson*
Attorney

United States Patent Office 2,716,299
Patented Aug. 30, 1955

2,716,299

MITERED JOINT FITTING

Sebet Silverman, Margate, N. J., assignor to The Nurre Companies, Egg Harbor City, N. J., a corporation of Indiana Application September 3, 1952, Serial No. 307,629

7 Claims. (Cl. 40—156)

This invention relates generally to mirrors and the like and is more particularly concerned with means for ornamentally framing the same.

A principal object of the present invention is to provide novel means for facilitating the assembly of frame elements and the mounting of a mirror or the like within the assembled frame, the arrangement being such as to render it unnecessary to provide the framed mirror with finished edges or dimensions which are closely determined with respect to its mounting frame.

Still another object of the present invention is to provide such a frame wherein the mirror and the elements that define the sight of the frame are secured in place by novel means adapted to function whether or not the mirror and the aforementioned elements are disposed in parallel planes.

A further important object of the present invention is to provide an arrangement for firmly securing the mitered joints of the frame of a mirror or the like, which arrangement is adaptable to various sizes and shapes of frames, includes component elements of standardized design, construction and size, does not detract from the appearance of the frame, and is easily mounted in operative position without the use of any special tools or devices.

Other objects and advantages of the present invention will appear more fully hereinafter, it being understood that the specific embodiments of the invention described herein are illustrative and that modifications thereof falling within the scope of the appended claims will be apparent to persons skilled in the art.

In the drawings:

Figure 1 is a front view of a framed mirror embodying the present invention.

Figure 2 is a bottom view of the framed mirror shown in Figure 1.

Figure 3 is an enlarged view of the lower left-hand corner of the framed mirror shown in Figure 1.

Figure 4 is an exploded perspective view of the corner shown in Figure 3.

Figure 5 is a perspective view of the outer part of the novel corner fitting of the present invention looking at the bottom and one side thereof.

Figure 6 is a perspective view of the inner part of the novel corner fitting of the present invention looking at the bottom and one side thereof.

Figure 7 is an enlarged section on line 7—7 of Figure 1; and

Figure 8 is similar to Figure 7 but shows the mirror and the members defining the sight of the frame disposed in parallel planes.

Referring to the drawings, it will be observed that the present invention is illustrated by the embodiment thereof in the form of a frame 10 mounting a mirror 11, the former comprising a back section 12 and frame-forming elements 13—13 and 14—14 secured to the section 12 through the medium of fittings 15.

The back section 12 includes a rectangular panel 16 of wood, Masonite or other suitable sheet material having top and bottom mouldings 17—17 and side mouldings 18—18. These mouldings are preferably made of wood and extend in endless relation to one another about the periphery of the panel 16, the proximate end portions of any adjacent pair thereof being mitered for abutting one another as at 19 and being cut for presenting coplanar surfaces 20—20 disposed at a right angle to the miter 19.

The mouldings 17—17 and 18—18 are generally rectangular in transverse cross section, being undercut for forming a recess having right angularly related surfaces 21 and 22. Each moulding is seated with its surface 21 upon the associated marginal portions of panel 16 and is further positioned with its surface 22 in close abutting relation to the proximated edge of the panel 16, being secured in such position by nails 23 driven through the back of the panel 16 and into the moulding. In the embodiment of the invention shown in Figure 7, it will be observed that the front surface 24 of the moulding slopes inwardly and rearwardly, while in the modified form shown in Figure 8 the front surface 25 of the moulding is disposed in coplanar relation to that of the mirror 11.

The exposed ornamental frame-forming elements 13—13 and 14—14 are each strips of plate glass mirror having parallel side edges extending longitudinally thereof. These frame-forming elements also extend in endless relation to one another about the periphery of the panel 16, and the outer marginal portions thereof are seated upon the front surface 24, or upon the front surface 25, of the mouldings 17—17 and 18—18. The proximate end portions of any adjacent pair of frame-forming elements 13—13 and 14—14 are provided with mitered edges 26—26, which are positioned in parallel spaced relation to one another, and are further provided with edges 27—27 cut at a right angle to edges 26—26 and positioned in registry with the proximate surfaces 20—20 of the associated mouldings.

For securing the frame-forming elements 13—13 and 14—14 to the back section 12 fittings 15 are provided. Each of these fittings comprises a main body part 28 and additional parts 29 and 30 associated respectively with the opposite end portions of the main body part 28. The latter is an elongated sheet metal element having opposed marginal portions extending longitudinally thereof for forming a channel 31 provided with parallel side walls 32—32 disposed normal to a base wall 33 and flanges 34—34 respectively extending inwardly from side walls 32—32 in coplanar relation to one another.

The part 29 comprises a strip of sheet metal lined with a suitable shock-absorbing material, such as sheet rubber, felt, plastic, cardboard or the like, glued or otherwise suitably secured to one face thereof. The part 29 is L-shaped and is formed with a long leg 35 and a short leg 36, the inside of the former being lined with a shock-absorbing strip 37 and the inside of the latter being lined with a shock-absorbing strip 38. The strip 37 is of a lesser width than the leg 35 and is apertured to receive a depressed portion 39 centrally apertured as at 40, and the strip 38 extends across the full width of the leg 36.

The part 30 comprises a strip of sheet metal also lined with a suitable shock-absorbing material as aforesaid glued or otherwise suitably secured to one face thereof. The part 30 also is L-shaped and is formed with a long leg 41 and a short leg 42, the inside of the former being lined with a shock-absorbing strip 43 and the inside of the latter being lined with a shock-absorbing strip 44. The strip 44 extends only part way across the leg 42, and the strip 43 extends across the full width of the leg 41, being provided as at 45—45 with apertures which register with similar apertures 46—46 in the leg 41.

In its assembled condition the fitting 15 is provided with a countersunk head bolt 47 projected through the aperture 40 in the leg 35 of the part 29, the aforementioned head being seated in the depressed portion 39 with its top generally level with the corresponding surface of leg 35, the bolt being provided with a nut 47a or any other suitable fastener. The leg 35 slidably fits into the channel 31 at one end of the main body part 28, the strip 37 being thereby disposed between the flanges 34—34, and the inward sliding movement of leg 35 is limited by the engagement of the opposite side portions of leg 36 with the end portions of flanges 34—34, the strip 38 being then disposed below the flanges 34—34. The leg 42 of the part 30 slidably fits into the channel 31 at the other end of the main body part 28, the strip 44 being thereby disposed between the flanges 34—34, and the inward sliding movement of leg 42 is limited by the engagement of the opposite side portions of leg 41 with the end portion of flanges 34—34, the strip 43 being then disposed below the flanges 34—34.

The mirror 11 is rectangular in shape, and the corners thereof are cut as at 48. The back of the mirror 11 is positioned flat against the panel 16 of the back section 12 with the outer marginal portions of the mirror between the panel 16 and the inner marginal portions of the frame-forming elements 13—13 and 14—14, the latter being thereby disposed in overlapping relation to the outer marginal portions of the mirror. In this connection, it will be noted that the inner edges of the frame-forming elements define the sight of the frame 10.

In the embodiment of the invention illustrated four fittings 15 are required, one at each corner of the frame 10. The main body part 28 of each fitting is disposed in covering relation to the parallel spaced edges 26—26 of the associated frame-forming elements. At the inner end of the main body part 28, the bolt 47 is projected rearwardly through an aperture 49 in the panel 16, and a nut 47a is threaded on the end thereof at the rear of the panel 16. The bolt 47 passes between the covered parallel spaced edges 26—26 and just outside the edge 48 of the mirror, the latter being thereby secured by the several bolts 47 against lateral displacement relatively to the back section 12 of the frame. Thus, the part 29 is secured in place with the strip 37 bearing upon the broad faces of, and the strip 38 bearing against the inner edges of, the associated frame-forming elements 13—14. At the outer end of the main body part 28, the part 30 is secured in place by a pair of wood screws 50—50 projected through the registering apertures 45—45 and 46—46 and into the associated mouldings 17—18, the part 30 being thus disposed with the strip 44 bearing upon the broad faces of the associated moulding elements 13—14 and the strip 43 bearing against the coplanar surfaces 20—20 of the associated mouldings 17—18.

It will be observed that the fit of the leg 35 of the part 29 and of the leg 42 of the part 30 in channel 31 is loose enough to permit disposition of the main body part 28 at an angle relative to the plane of the mirror 11, as in Figure 7, or parallel thereto, as in Figure 8.

To assemble the frame 10 and the mirror 11, the back section 12 of the former is preferably supported on its back. Then the mirror 11 is placed on the panel 16 and suitably positioned, and the frame-forming elements 13—13 and 14—14 are rested in position on the mirror 11 and mouldings 17—17 and 18—18. The main parts 28 are then placed so that at the outer end of each, the channel 31 engages the leg 42 of a part 30, which is permanently secured to the associated mouldings 17—18, and so that the inner end of each is elevated from the mirror 11 and the frame-forming elements 13—13 and 14—14. Then the legs 35 of the parts 29 are fitted with the bolts 47 and are inserted respectively in the channels 31 at the inner ends of the main parts 28. Each main part 28 and its associated part 29 and bolt 47 are next lowered as a unit so that the bolt 47 is projected through its aperture 49 in the panel 16, and the nuts 47a are threaded on the ends of bolts 47, the part 29 being thus secured in place and the main part 28 being secured in place between the parts 29 and 30. In this condition, the fittings 15 secure the mirror 11 in position not only by their clamping action but also by the positive engagement of the sides of the several bolts 47 with the cut edges 48 at the corners of the mirror 11, and the fittings 15 secure the frame-forming elements 13—13 and 14—14 in position not only by their clamping action but also by positive coaction between the frame-forming elements 13—13 and 14—14 and fittings 15, which coaction serves to maintain the frame-forming elements 13—13 and 14—14 in place even though the several bolts 47 become somewhat loosened.

The width of the main body part 28 of the mounting fitting is quite substantial and, therefore, conceals the edges of the members that come together thereunder, e. g., edges 48, 26—26, and 19—19. Consequently, these edges need not be shaped with the same degree of preciseness as would be necessary if they were to be exposed to view. Even slight variations in the widths of adjacent frame-forming elements 13—14 are accommodated by the fitting 15, which, it will be apparent, is neat and does not detract from the appearance of the frame.

The main body part 28 of the mounting fitting can be furnished to suit the width of the particular frame-forming elements being used, while the parts 29 and 30 remain the same. In other words, a manufacturer can standardize on parts such as 29 and 30 and cut the main body part 28 to length as required.

Also, by virtue of the fact that ample clearance is provided between the marginal edges of the mirror 11 and the corresponding inner edges of the mouldings 17—17 and 18—18, said marginal edges of the mirror need not be absolutely squared or otherwise finished to exact predetermined specifications. By providing frame-forming elements 13—13 and 14—14 of sufficient width to adequately overlap the marginal edges of the mirror 11, said edges are concealed from view and a finished appearance is imparted to the framed mirror by the finished edges of the frame-forming members secured together in assembled relation as above described.

Although the mounted member 11 and the frame-forming elements 13—13 and 14—14 are shown and described as plate glass mirrors, applicant does not intend to be limited specifically to a construction employing plate glass mirrors since said frame-forming elements may well be made of suitably ornamented wood, plastic or other material. Furthermore, applicant does not intend to be limited specifically to a construction of frame having the rectangular shape shown and described herein only for the purpose of illustration. Still further, applicant does not intend to be limited to a construction wherein the fittings 15 are made of sheet metal as other materials might readily be substituted. Accordingly, it will be understood that the construction of the present invention, as herein illustrated and described, is susceptible of various changes and modifications which may be made from time to time without departing from the general principles or real spirit of the present invention, and it is accordingly intended to claim the same broadly, as well as specifically, as indicated in the appended claims.

What is claimed as new and useful is:

1. The combination comprising a frame and a member mounted therein, said frame including a section in back of said member, a plurality of elements positioned in end to end relation to one another about the periphery of said section, and a plurality of fittings for securing said member and said elements to said section, said elements being provided with inner marginal portions disposed in overlapping relation to the opposed outer marginal portions of said member, the inner edges of said elements defining the sight of said frame, and each of said fittings comprising an elongated part disposed in covering relation to the proximate end portions of a pair of said elements, and comprising means for securing said part to said section, said member and elements being clampingly secured between said fittings and section.

2. The combination comprising a frame and a member mounted therein, said frame including a section in back of said member, a plurality of elements positioned in end to end relation to one another about the periphery of said section, and a plurality of fittings for securing said member and said elements to said section, said elements being provided with inner marginal portions disposed in overlapping relation to the opposed outer marginal portions of said member, the inner edges of said elements defining the sight of said frame, and each of said fittings comprising an elongated part having opposite end portions secured to said section, said part being disposed in covering relation to the proximate end portions of a pair of said elements, the means securing said part as aforesaid including at the inner end portion of said part an element against which the outer edge of said member abuts, said abutments being effective to prevent planar movement of said member, and said member and elements being clampingly secured between said fittings and section.

3. In a frame of the character described, a back section, a plurality of elements positioned in end to end relation to one another about the periphery of said section, and a plurality of fittings for securing said elements to said section, said elements being provided with inner marginal portions disposed in spaced relation to said section, said frame being thus adapted to receive between said inner marginal portions of the elements and said section the outer marginal portions of the member to be mounted therein, the inner edges of said elements defining the sight of said frame, and each of said fittings comprising an elongated part of a width to cover the proximate end portions of a pair of said elements and comprising means for securing said part to said section, said parts of the several fittings being positionable to clampingly secure between said fittings and section said elements and member.

4. In a frame of the character described, a back section, a plurality of elements positioned in end to end relation to one another about the periphery of said section, and a plurality of fittings for securing said elements to said section, said elements being provided with inner marginal portions disposed in spaced relation to said section, said frame beng thus adapted to receive between said inner marginal portions of the elements and said section the outer marginal portions of the member to be mounted therein, the inner edges of said elements defining the sight of said frame, and each of said fittings comprising an elongated part having opposite end portions secured to said section, said part being of a length and width to cover the proximate end portions of a pair of said elements, the means securing said part as aforesaid including at the inner end portion of said part an element against which there will abut the outer edge of said member, said abutments being effective to prevent planar movement of said member, said parts being positionable to clampingly secure between said fittings and section said elements and member.

5. In a frame of the character described, a back section, a plurality of elements positioned in end to end relation to one another about the periphery of said section, and a plurality of fittings for securing said elements to said section, said elements being provided with inner marginal portions disposed in spaced relation to said section, said frame being thus adapted to receive between said inner marginal portions of the elements and said section the outer marginal portions of the member to be mounted therein, the inner edges of said elements defining the sight of said frame, and each of said fittings comprising an elongated part of a width to cover the proximate end portions of a pair of said elements, means associated with the outer end portion of said part, permanently mounted on said section and slidably detachably engaged with said part, and means associated with the inner end portion of said part and detachably securing the same to said section, the latter means including an element against which there will abut the outer edge of said member, said abutments being effective to prevent planar movement of said member, and said parts being positionable to clampingly secure between said fittings and section said elements and said member an open ended channel extending longitudinally thereof, said part being of a width to cover the proximate end portions of a pair of said elements, the inner end portion of said part being held in place by an additional part slidably received in one open end of said channel and detachably secured to said section, and the outer end portion of said part being held in place by another part slidably received in the other open end of said channel and permanently secured to said section.

6. The combination comprising a frame and a member mounted therein, said frame including a plurality of elements positioned in end to end relation to one another about the periphery of said frame, and a plurality of fittings for said elements, the latter being provided with inner marginal portions disposed in overlapping relation to the opposed outer marginal portions of said member, the inner edges of said elements defining the sight of said frame, and each of said fittings comprising an elongated part disposed in covering relation to the proximate end portion of a pair of said elements, and means for securing said part in place, said fittings being operative to clampingly secure said elements in position.

7. In a frame of the character described, a plurality of elements positioned in end to end relation to one another about the periphery of said frame, and a plurality of fittings for said elements, said elements being provided with inner marginal portions adapted to overlie the outer marginal portions of the member to be mounted in said frame, the inner edges of said elements defining the sight of said frame, and each of said fittings comprising an elongated part disposed in covering relation to the proximate end portions of a pair of said elements, and means for securing said part in place, said fittings, being operative to clampingly secure said elements in position.

References Cited in the file of this patent

UNITED STATES PATENTS

| 776,181 | Hosmer | Nov. 29, 1904 |
| 899,556 | Parker | Sept. 29, 1908 |
| 1,202,321 | Schleicher | Oct. 24, 1916 |
| 2,201,335 | Cotter | May 21, 1940 |
| 2,275,127 | Brown | Mar. 3, 1942 |

FOREIGN PATENTS

| 424,431 | Great Britain | Feb. 21, 1935 |